Figure 1:
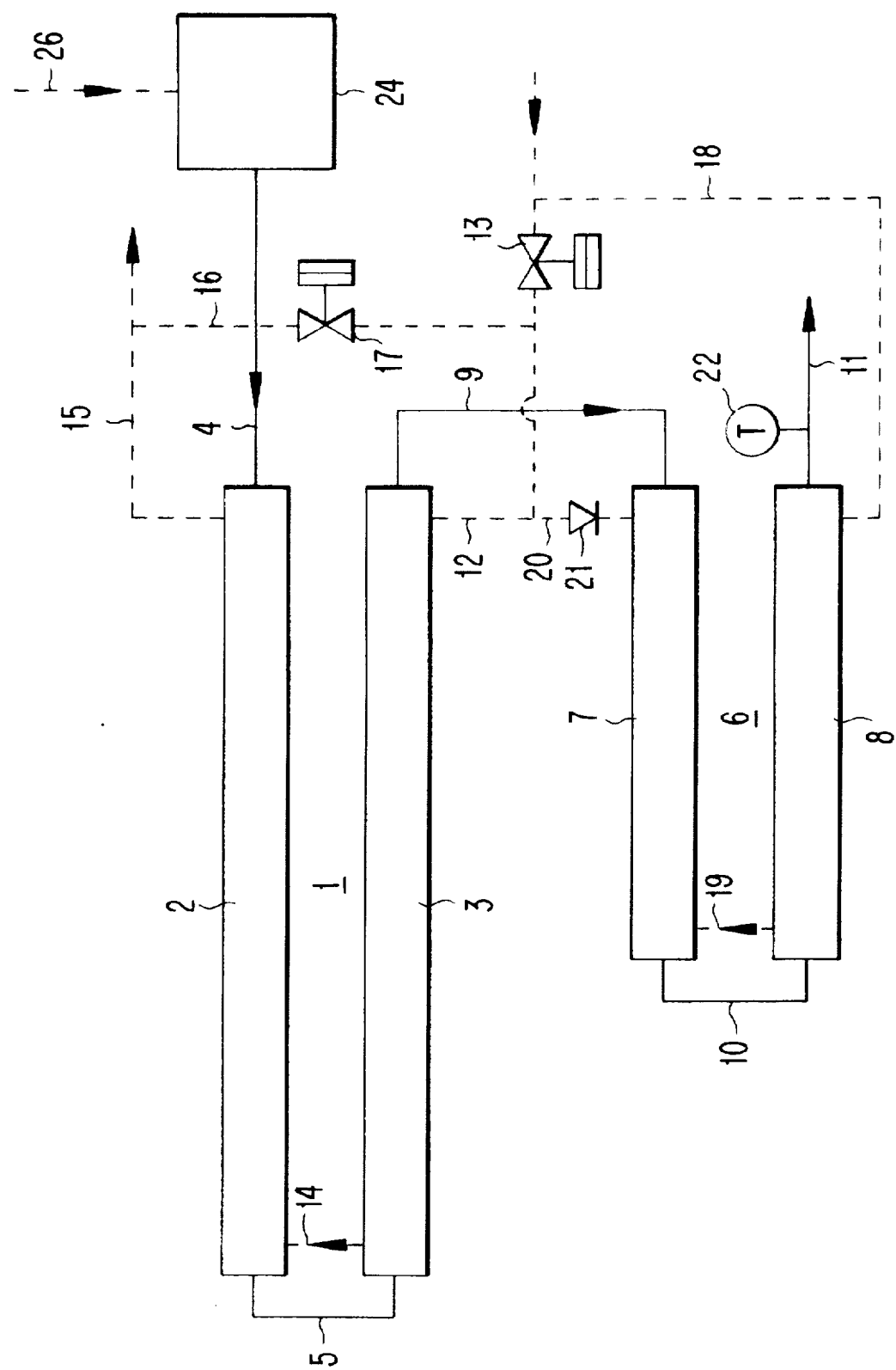

United States Patent [19]
Arph

[11] Patent Number: 5,893,270
[45] Date of Patent: Apr. 13, 1999

[54] ARRANGEMENT AND METHOD FOR CONTINUOUS COOLING OF FOOD PRODUCTS

[75] Inventor: Sten-Olof Arph, Lund, Sweden

[73] Assignee: Tetra Laval Holdings & Finance S.A., Pully, Switzerland

[21] Appl. No.: 08/809,750

[22] PCT Filed: Oct. 4, 1995

[86] PCT No.: PCT/SE95/01138

§ 371 Date: Apr. 7, 1998

§ 102(e) Date: Apr. 7, 1998

[87] PCT Pub. No.: WO96/10921

PCT Pub. Date: Apr. 18, 1996

[30] Foreign Application Priority Data

Oct. 7, 1994 [SE] Sweden ................................. 9403402

[51] Int. Cl.⁶ ............................................. F25D 13/04
[52] U.S. Cl. ........................ 62/65; 62/63; 62/374
[58] Field of Search ........................... 62/63, 65, 374, 62/380

[56] References Cited

U.S. PATENT DOCUMENTS

| | | | |
|---|---|---|---|
| 3,805,538 | 4/1974 | Fritch, Jr. et al. | 62/65 |
| 4,265,096 | 5/1981 | Andersson | 62/65 |
| 4,278,698 | 7/1981 | Mauer | 62/65 |

*Primary Examiner*—Ronald Capossela
*Attorney, Agent, or Firm*—Burns, Doane, Swecker & Mathis, L.L.P.

[57] ABSTRACT

An arrangement for continuous cooling of food products which have been heat treated by heating to a high temperature in a heat treatment unit which is connected between a holding cell in this and a further treatment unit. The arrangement comprises two indirectly working cooling sections (1,6) through which the product is brought to pass. During a first period only the first cooling section (1) is active, i.e. the cooling medium passes in counter current through the cooling section. During a second consecutive period a further cooling section (6) is arranged to be activated in that cooling medium passes also this second cooling section. The second cooling section (6) is arranged after the first cooling section as seen in the direction of flow for the product.

8 Claims, 2 Drawing Sheets

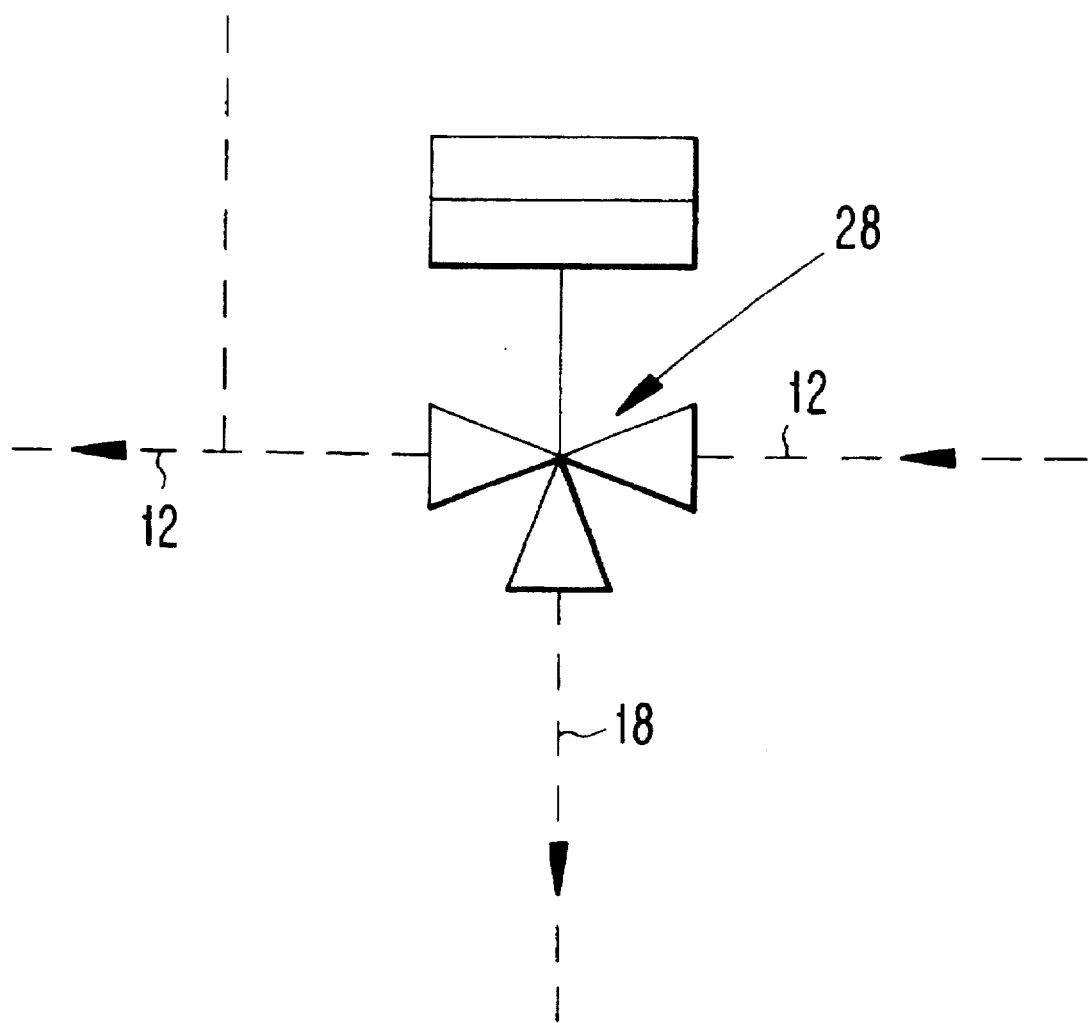

ARRANGEMENT AND METHOD FOR CONTINUOUS COOLING OF FOOD PRODUCTS

The present invention relates to an arrangement and a method for continuous cooling of food products which have been heat treated by heating to a high temperature in a heat treatment unit.

When heat treating food products to high temperatures one strives after achieving a certain combination of time and temperature at a desired high sterilization temperature. The temperature and the time are then in contradiction with each other in such a way that the higher the temperature the shorter is the holding time needed in order to achieve a desired killing of microorganisms. Usual temperature combinations at sterilization are within the field 135–150° C. at 10–2 seconds. In order to avoid any influence on the different nutritive substances in the product one tries both to heat and cool rapidly and at that desires to keep the time during which the product is heated to temperatures above 100° C. as short as possible.

During the latest time one has found certain especially heat resistant spores in different food products, which means that one has been forced to heat treat at a very high temperature in order to obtain sterility.

In indirect cooling from such a high temperature one usually works with a relatively large difference in temperature between the cooling medium and the food product in order to obtain a high cooling rate. In such a rapid cooling there may be problems with fouling on the product side in the cooling means (heat exchanger) that are used. This fouling may impair the heat capacity and at that lower the cooling effect. The fouling may also lead to a short operation time, such that cleaning of the heat exchangers must take place after only 10–12 hours.

According to the invention there is now proposed a solution to these problems which makes the operation time considerably longer before the heat treatment plant must be stopped to clean the cooling means.

The arrangement according to the invention is mainly characterized in that it is connected between a holding cell in a heat treatment unit and a further treatment unit and that it comprises at least two indirectly working cooling sections through which the product is forced to pass. During a first period only the first cooling section is active, i.e. cooling medium passes in counter current through the cooling section, while during a second following period a second cooling section is activated in that cooling medium passes also this cooling section in counter current. The second cooling section is arranged after the first cooling section as seen in the flow direction for the product. In such an arrangement there is obtained a rapid increase of the available cooling effect in a simple manner.

Each cooling section may comprise one or several tubes or plate heat exchangers connected in series.

The further treatment unit may consist of a flashing step if the heating of the product to sterilization temperature has taken place by direct steam injection into the product. If the heating takes place by indirect heat exchange the following treatment may consist of a further cooling step.

With advantage the arrangement is designed such that the product channels of the first and the second cooling sections are connected in such a way that the product during the first as well as the second period passes through both cooling sections.

Alternatively, a change over may take place in the product conduit in such a way that this second cooling section is put in circuit first during the second period. However, this means a change of the flow conditions for the product which momentarily may give rise to pressure drops which disturb the function of the heat treatment unit.

The arrangement according to the invention may preferably have a conduit for cooling medium connected to the outlet side of the first cooling section and means arranged to gradually increase the flow in a second conduit during the second period until the whole flow of cooling medium has been brought to pass as well the first as the second cooling section.

An arrangement according to the invention may comprise a flow regulating valve arranged in the first conduit and a spring loaded non-return valve arranged in the second conduit between the connection to the first conduit and a connection to the first cooling section, at which the non-return valve opens when the flow regulating valve has been brought to close the connection through the first conduit.

The regulating valve in the arrangement according to the invention is with advantage arranged to be controlled by a temperature sensor, which senses the product temperature.

A three-way valve may alternatively be used for switching the flow from the first to the second conduit. The valve operates as a shunt valve and gradually directs a larger and larger part of the flow through the second conduit.

According to the method of the invention the product after heating to a predetermined temperature during a predetermined time is brought to pass at least two cooling sections in order to be cooled to a desired intermediate temperature, at which the product during a first period is cooled in the first cooling section and then with retained temperature passes the second cooling section while the product during a second period is cooled both in the first and in the second cooling section before it is treated further in a desired manner.

According to the invention the food product is heated to a desired high temperature by means of steam injection, for which reason the product which passes the cooling section consists of a mixture of product and condensed steam.

The invention is described further with reference to the accompanying drawing figures, in which:

FIG. 1 schematically illustrates a first exemplary embodiment of the present invention; and FIG. 2 schematically illustrates portions of a second exemplary embodiment of the present invention.

FIG. 1 illustrates a cooling section 1 comprising two heat exchangers 2,3 connected in series in which the cooling takes place. The cooling section 1 is by way of a conduit 4 for a food product connected to a holding cell in a heat treatment unit 24. The heat exchangers 2 and 3 are connected by way of a product conduit 5. A second cooling section 6 comprises two heat exchangers 7,8 connected in series. The cooling section 1 and the cooling section 6 are connected by way of a conduit 9 for the food product. There is a conduit 10 between the heat exchangers 7 and 8. Leading away from the heat exchanger 8 there is an outlet conduit 11 for product. Cooling medium is supplied to the arrangement by way of a conduit 12 from a cooling source not shown. In the conduit 12 there is a regulating valve 13 by way of which the flow through the conduit may be controlled. The conduit 12 leads to the heat exchanger 3. Between the heat exchangers 2 and 3 there is a conduit 14 for cooling medium and a conduit 15 at the inlet to the heat exchanger 2 leads cooling medium out from the arrangement. A by-pass conduit 16 with a further regulating valve 17 is connected between the conduit 12 and the conduit 15. Between the conduit 12 and the outlet from the heat exchanger 8 there is a conduit 18. A conduit 19 for cooling medium connects the heat exchanger 7 and 8. At the inlet to the heat exchanger 7 there is a conduit for cooling medium 20 and a spring-loaded non-return valve 21. A temperature sensor 22 is arranged at the product outlet from the cooling section 6.

FIG. 2 illustrates a second exemplary embodiment of the present invention, in which the switch-over between the two flow ways for cooling medium may alternatively take place by way of a three-way valve 28 arranged in the conduit 12 and connected to the conduit 18.

A food product which has passed a high temperature treatment in a treatment unit is led to the arrangement according to the invention with a temperature of 140–150° C. The product meets cooling medium with an input temperature of –75° C. in counter current which medium is led to the cooling section 1 through the conduit 12. When the arrangement is put into operation and all surfaces in the heat exchangers are clean a part of the flow of cooling medium may be led through the regulating valve 17 and the by-pass conduit 16. The cooling in the cooling section is controlled by way of a temperature sensor 22 at the outlet from the cooling section 6. The product is cooled to a temperature of 100–120° C. When the cooling effect diminishes in the heat exchangers 2 and 3, i.e. when the temperature of the product rises, the regulating valve 17 is actuated in such a way that a larger and larger part of the flow of cooling medium is forced into the heat exchanger 3 by way of the conduit 12. During this phase of the cooling the regulating valve 13 is completely open. Cooling medium has filled the conduits 18 and 19 and the spaces for cooling medium in the heat exchangers 7 and 8. There is now flow, however, in this path since the non-return valve 21 is closed. The product which has left the cooling section 1 flows through the cooling section 6 but is not cooled further, since the stagnant cooling medium rapidly reaches the temperature of the product.

When all cooling medium passes cooling section 1 and the regulating valve 17 is closed, but the product temperature which is sensed by the temperature sensor 22 starts to rise, the cooling section 6 is taken into operation. The regulating valve 13 or 28 is brought to diminish the flow through the conduit 12 and the pressure in the conduit 20 rises in such a way that the non-return valve 21 is opened. A larger and larger part of the cooling medium is brought to pass the cooling section 6 and is then lead further to the cooling section 1. At the end the whole flow of cooling medium is brought to follow this path. When the product temperature at the outlet from the heat exchanger no longer may be kept at the desired temperature (sensed by the temperature sensor 22) the operation must be stopped in order to clean the plant.

An arrangement which is connected in the way which has now been described is very suitable in order to obtain a gentle cooling of a food product. In that the product during as well the first period (when only cooling section 1 is active) as the second period (when both cooling sections 1 and 6 are active) follows the same flow path, there are no pressure drops or sudden temperature fluctuations which may influence the treatment both prior to and after the cooling.

If the product is heat treated by steam injection directly into the product, as by steam injection line 26, such that the product which is to be cooled consists of a mixture of product and condensed steam, a cooling in the now described arrangement has been shown to function especially well.

I claim:

1. An arrangement for continuous cooling of food products, which have been heat treated by heating to a high temperature in a heat treatment unit, for positioning between a holding cell in a heat treatment unit and a further treatment unit, comprising:

a first cooling section;

a second cooling section;

means to convey said food products from said first cooling section to said second cooling section, said means to convey defining a product path;

a cooling medium flow path including a first portion through said first cooling section and a second portion through said second cooling section, said first and second portions conducting cooling medium in countercurrent flow relative to said product path;

means to control flow of cooling medium along said cooling medium flow path to said first cooling section and said second cooling section in response to a sensed temperature of said food products exiting said second cooling section.

2. An arrangement according to claim 1, said means to convey for conveying said food product through both said first and second cooling sections when said means to control flow of cooling medium allows cooling medium to flow through a portion of said cooling medium flow path selected from the group consisting of said first cooling portion and both said first and second cooling portions.

3. An arrangement according to claim 1, wherein said product path defines a first cooling section product inlet, a first cooling section product outlet, a second cooling section product inlet, and a second cooling section product outlet, said cooling medium flow path comprising a first conduit for cooling medium connected at said first cooling section product outlet and a second conduit for cooling medium connected to said first conduit and connected at said second cooling section outlet, and wherein said means to control flow of cooling medium gradually increases the flow of cooling medium in said second conduit when the temperature of said product when exiting said second cooling section is above a predetermined level until the whole flow of cooling medium flows along said cooling medium flow path from said second cooling section to said first cooling section.

4. An arrangement according to claim 3, further comprising:

a flow regulating valve arranged in said first conduit;

a spring loaded non-return valve arranged in said second conduit between the connection to said first conduit and said second cooling section.

5. An arrangement according to claim 4, further comprising a temperature sensor positioned for sensing the temperature of said product at said second cooling section product outlet, and wherein said flow regulating valve is in communication with and controlled based on a temperature sensed by said temperature sensor.

6. An arrangement according to claim 3, wherein said means to control flow of cooling medium along said cooling medium flow path comprises a three-way valve in fluid communication with said first and second conduits, said three-way valve selectively directing and dividing the flow of cooling medium through said first and second conduits.

7. A method for continuous cooling of food products which have been heat treated to a high temperature, comprising the step of:

conveying the product through at least two cooling sections;

cooling said product to a desired intermediate temperature in at least one of said first and second cooling sections, said cooling further comprising a set of steps selected from the group consisting of:

(A) (i) cooling said product in said first cooling section and then (ii) conveying said product through said second cooling section; and (B) (i) cooling said product first in said first cooling section and then (ii) cooling said product in said second cooling section.

8. A method according to claim 7, further comprising heating said food product to a desired high temperature by steam injection, said food product which passes from said cooling sections comprising a mixture of food product and condensed steam.

* * * * *